United States Patent [19]

Flack et al.

[11] Patent Number: 4,828,635

[45] Date of Patent: May 9, 1989

[54] LAMINATED, THERMAL INSULATION PANEL

[75] Inventors: John Flack, Rexdale; David W. Bailey, Oakville, both of Canada

[73] Assignee: Les Produits Isolofoam Inc., Beauce, Canada

[21] Appl. No.: 180,884

[22] Filed: Apr. 13, 1988

[51] Int. Cl.⁴ .................. E04B 2/00; E04F 13/00; B32B 3/26; B32B 7/12

[52] U.S. Cl. .................................. 156/71; 428/198; 428/201; 428/286; 428/296; 428/316.6; 428/317.7

[58] Field of Search ............... 156/71; 428/198, 201, 428/286, 296, 316.6, 317.7

[56] References Cited

U.S. PATENT DOCUMENTS

| | | | |
|---|---|---|---|
| 3,312,585 | 4/1967 | Hamme | 428/126 |
| 3,350,257 | 10/1967 | Hourigan et al. | 428/70 |
| 3,531,367 | 9/1970 | Karsten | 428/317.7 |
| 3,666,595 | 5/1972 | Bauer | 428/317.7 |
| 3,847,647 | 11/1974 | Bahlo | 428/317.7 |
| 3,962,504 | 6/1976 | Sherwin | 428/40 |
| 4,083,159 | 4/1978 | Hatch et al. | 52/309.1 |

Primary Examiner—William J. Van Balen
Attorney, Agent, or Firm—Foley & Lardner, Schwartz, Jeffery, Schwaab, Mack, Blumenthal & Evans

[57] ABSTRACT

A laminated, thermal insulation panel comprises a board made of expanded, molded polystyrene, and a membrane laminated on one side of the polystyrene board by means of an adhesive. The board and membrane are both permeable to water vapor, but the membrane is also impervious to air and moisture. The adhesive is applied under the form of strips and presents permeability to water vapor while being compatible with both the board polystyrene and the membrane material. Accordingly, the adhesive does not chemically attack the polystyrene and membrane material, whereby the water vapor permeability and air/moisture imperviousness of the latter are not affected. It can be appreciated that the resulting insulation panel is impervious to air and moisture from the outside but is permeable to water vapor from the inside. The joints between adjacent, laminated insulation panels are sealed by means of an adhesive tape applied on the membranes of the adjacent panels.

16 Claims, 2 Drawing Sheets

LAMINATED, THERMAL INSULATION PANEL

BACKGROUND OF THE INVENTION

1. Field of the Invention

The present invention relates to a laminated, thermal insulation panel for outside covering of a construction, such as a residential house, which insulation panel is impervious to air and moisture from the outside but is permeable to water vapor from the inside.

2. Brief Description of the Prior Art

Rigid polystyrene insulation material is presently widely used in residential construction for exterior wall insulation. Such insulation material is commonly available under the form expanded, molded polystyrene boards. These boards are mounted adjacent to each other to cover the entire, exterior wall surface of the residential construction.

In order to prevent air and moisture from the outside to penetrate into the walls, a membrane permeable to water vapor but impervious to air and moisture is applied externally on the polystyrene boards. This membrane must totally and adequately cover the exterior surface to give proper protection. In particular, it must seal all cracks, fissures and joints in the wall structure to prevent air and moisture penetration. Accordingly, a problem is to adequately and suitably attach the membrane to the exterior wall assembly.

One can appreciate that it is not possible to staple the membrane to the soft, pliable cellular plastic polystyrene for adequate interface contact. Consequently, the membrane is conventionally attached to the wood stud framing of the wall substrate by stapling through the membrane, in particular through the lapped joints thereof. Decision as to the proper lapping over of the membrane, the proper laps and the number of staple fixation points is left to the specialized on-site workmen. This often results into unappropriate fixation of the membrane and/or in unadequate covering of the exterior wall surface by the membrane.

As the polystyrene boards and the membrane are both breathable to the diffusion of water vapor conveyed from the inside to the outside, condensation within the wall structure is thereby prevented. However, when the membrane is not adequately applied on the exterior wall surface for any of the above reasons, air and moisture can penetrate into the wall to cause condensation and/or air infiltration inside of the wall and eventually inside of the house.

As the membrane is commonly available under the form of rolls, another problem is that application of this membrane on the exterior wall surface becomes very difficult in presence of high winds. Moreover, high winds can cause tearing of the lapped joints of the membrane during construction.

OBJECT OF THE INVENTION

An object of the present invention is therefore to provide a laminated, thermal insulation panel and a thermal, wall insulation method which eliminate all of the above discussed drawbacks of the prior art.

SUMMARY OF THE INVENTION

More specifically, according to the present invention, there is provided a laminated, thermal insulation panel comprising:

a board made of expanded polystyrene permeable to water vapor;

a membrane laminated over one side of the polystyrene board, which membrane presents imperviousness to air and moisture and permeability to water vapor; and an adhesive applied between the membrane and board for laminating the membrane on said one side of the polystyrene board, said adhesive being applied in a pattern to ensure permeability to water vapor and being compatible with both the polystyrene of the board and the material constituting the membrane, so that the adhesive does not chemically attack the board polystyrene and the membrane material whereby the water vapor permeability of the board polystyrene and the membrane material as well as the air/moisture imperviousness of the membrane material are not affected by the adhesive.

Preferably, the membrane is made of non-woven, spunbonded olefin, and the board of expanded, molded polystyrene.

In accordance with a preferred embodiment of the laminated, insulation panel of the invention, the pattern is formed by a plurality of strips of an adhesive comprising as elastomeric base a blend of polybutene and styrene-isoprene-styrene block copolymer, and as tackifying resins a blend of synthetic hydrocarbon resins and rosin esters.

In accordance with the present invention, there is further provided a method of thermally insulating the exterior walls of a construction, such as a residential house, comprising the steps of:

in-plant manufacturing laminated, thermal insulation panels each obtained by laminating a membrane over one side of a board made of expanded polystyrene, which board and membrane are both permeable to water vapor and which membrane is further impervious to air and moisture;

covering the outside of said walls with a plurality of said insulation panels with the membrane thereof at the exterior; and sealing the joints between adjacent ones of the panels with an adhesive tape impervious to air and moisture which tape comprising an adhesive surface applied on the membranes of the adjacent panels.

Preferably, the tape comprises permanent acrylic adhesive with an oriented polypropylene backing.

BRIEF DESCRIPTION OF THE DRAWINGS

The objects, advantages and other features of the present invention will become more apparent upon reading of the following non restrictive description of a preferred embodiment thereof, given in conjunction with the accompanying drawings in which.

DETAILED DESCRIPTION OF THE PREFERRED EMBODIMENT

Figure 1:
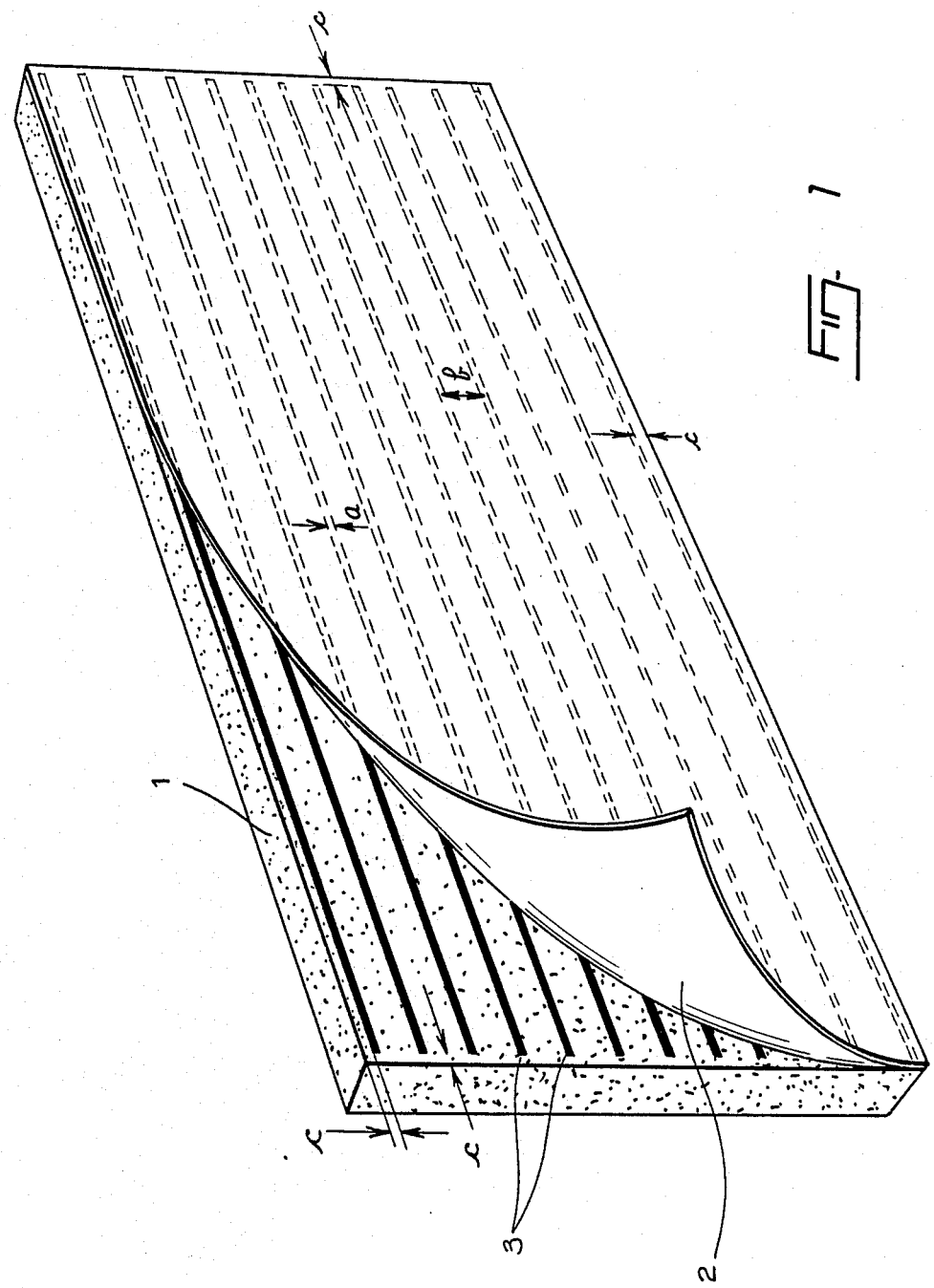
FIG. 1 illustrates the structure of a laminated, thermal insulation panel in accordance with the present invention.

As illustrated in FIG. 1, the laminated, thermal insulation panel comprises (a) a board 1 made of expanded, molded polystyrene of varying thickness which is permeable to water vapor, and (b) a membrane 2 which is impervious to air and moisture, while being also permeable to water vapor. The membrane 2 is laminated over one side of the board 1 by neans of a suitable adhesive applied in a pattern, for example longitudinal strips 3 as shown in FIG. 1, to ensure permeability to water vapor. The adhesive should of course be compatible with both the membrane 2 and the board 1, i.e. it does not attack chemically these board and membrane whereby the water vapor permeability and the air/moisture imperviousness of the same are not affected by the adhesive.

Each of the board 1, the membrane 2 and the adhesive forming the strips 3 will now be described separately by means of their characteristics and/or composition. Of course, the different elements forming the insulation panel have been selected for the best results, which selection results from a wide experimentation.

The board 1 is advantageously composed of an expanded, molded polystyrene board. An example is the board of Type-1 manufactured and commercialized under the trademark ISOLOFOAM by the Applicant company "LES PRODUITS ISOLOFOAM INC.". The board 1 can vary in thickness depending on the desired level of thermal insulation. Of course, the ISOLOFOAM board is permeable to water vapor.

Tests on a specimen of ISOLOFOAM expanded polystyrene board of Type-1 have given the following results:

Average thickness: 36.8 mm
Bulk density: 15.5 kg/m$^3$
Hot surface temperature: 34.8° C.
Cold surface temperature: 13.7° C.
Temperature difference: 21.1° K.
Mean temperature of test: 24.3° C.
Heat flux (through the thickness): 21.52 W/m$^2$
Thermal conductance: 1.020 W/(m$^2$ °K.)
Thermal resistance: 0.980 m$^2$ °K./W
Thermal conductivity: 0.0375 W/(m °K.)
Thermal resistance by unit thickness: 26.6 m °K./W These tests were performed with the specimen placed horizontally in a 610 mm$^2$ Heat Flow Meter Apparatus. Heat flowed upwards through the specimen during testing. Paper-backed glass fiber insulation was placed around the perimeter of the plates of the Heat Flow Meter Apparatus and of the specimen to reduce edge heat losses.

Additional tests carried out on a plurality of specimen 25 mm thick of ISOLOFOAM expanded, molded polystyrene board of Type-1 indicated the following results:

Average compressive strength: 80 kPa
Average Flexural strength: 193 kPa

The membrane 2 is advantageously that manufactured and commercialized by the company DUPONT CANADA under the trademark TYVEK. The TYVEK membrane is a sheet of fine synthetic fibers. More specifically, it is composed of non-woven, spun-bonded olefin. As it is totally synthetic, it does not shrink nor rot. It resists to tear and puncture, it is permeable to water vapor but is impervious to air and moisture. It therefore constitutes an air/moisture barrier and accordingly an energy saving air barrier.

Some data given by the manufacturer concerning the TYVEK membrane are the following:

Water vapor transmission rate (g/100 in$^2$- 24 hours): 51.30
Weight (lb/1000 ft$^2$): 8.81
Rupture resistance (lb/in$^2$): 105.00
Tearing resistance (lb)
 (lengthwise): 32.50
 (transversal): 24.80

Porosity to the air - seconds: 7.60
Resistance to water (cm of water pressure): 99.30
Thickness (mils): 6.10

The adhesive pattern is formed, in the example of FIG. 1, by a plurality of longitudinal strips 3 of the adhesive SWIFT #68468 manufactured and commercialized by the company SWIFT adhesives, division of Reichhold Limited. Some of its physical properties are the following:

ELASTOMERIC BASE: Blend of Polybutene and Styrene-Isoprene-Styrene block copolymer
TACKIFYING RESINS: Blend of synthetic hydrocarbon resin and rosin esters
VISCOSITY: 12-15 poise
SOLIDS: 48-50%
FLASH POINT: −18° C. (T.C.C.*)
SPECIFIC GRAVITY: 0.84 g/cc

* Abbreviation for Tag (actually Tagliabue) closed cup, a type of flash point test.

The SWIFT #68468 adhesive is a solvent-base pressure-sensitive adhesive of the permanent type including a blend of synthetic rubber and of aliphatic/aromatic hydrocarbons in a solvent. It has been formulated expressly for applications requiring high peel strength and holding power. The adhesive exhibits high shear strength over a broad range of service temperatures as well as an aggressive tack to a wide variety of surfaces.

In order to laminate the TYVEK membrane 2 on the ISOLOFOAM polystyrene board of Type-1, it is not sufficient to think to use an adhesive to glue the membrane 2 on the board 1. Indeed, the following requirements must be taken into consideration:

the adhesive must not attack chemically neither the membrane 2 nor the board 1 whereby these board and membrane keep their physical characteristics, i.e. the adhesive must be compatible with both the board 1 and membrane 2;

the adhesive must be applied in a pattern to ensure permeability to water vapor in order to cause no reduction in water vapor permeability of the overall insulation panel; and the adhesive must produce a suitable bond between the membrane 2 and board 1.

Accordingly, one can appreciate that the selection of the adhesive cannot be effected without a great quantity of tests and experimentations. Laminating the membrane 2 on the board 1 is not an evident matter when it is desired to obtain an insulation panel having the appropriate, desired characteristics.

The adhesive SWIFT #68468 meets with these requirements as it is non chemically aggressive when confronted with the materials forming the board 1 and membrane 2 at temperatures under 70° C. Accordingly, it bonds the two materials without altering their chemical or performance characteristics.

Moreover, the adhesive SWIFT #68468 dries quickly. Accordingly, in the manufacture process, it is not required to speed up cure by subjecting it to temperatures above 70° C. at which the adhesive attacks chemically the polystyrene of the board 1.

The selected adhesive provides a bond between the board 1 and membrane 2 strong enough that when the TYVEK membrane is removed, it tends to remove the surface of the polystyrene of the board 1. This results into stability of laminate while slippage is not a problem. However, due to the strong adhesion, re-adhesion properties are poor.

It has been experimented that strips 3 of a width a=12.7 mm lengthwise of the insulation panel at a distance b=100 mm between the centers of each pair of adjacent strips 3 provide for good bond between the TYVEK membrane 2 and the ISOLOFOAM board 1. Such a bond is strong enough to prevent delamination problems or flapping situations.

A distance c=3.2 mm is maintained between the ends of the strips 3 and the corresponding edge of the board 1, as well as betwee the outer strips 3 and the respective board edges.

Total covering of the surface of the board 1 with adhesive is not desirable due to potential negative effects on the water vapor transmission rate through the insulation panel.

It should also be pointed out that other types of adhesive having similar characteristics can eventually be used, for example pressure-sensitive adhesives including natural rubber, or moisture cured urethane, etc.

Figure 2:
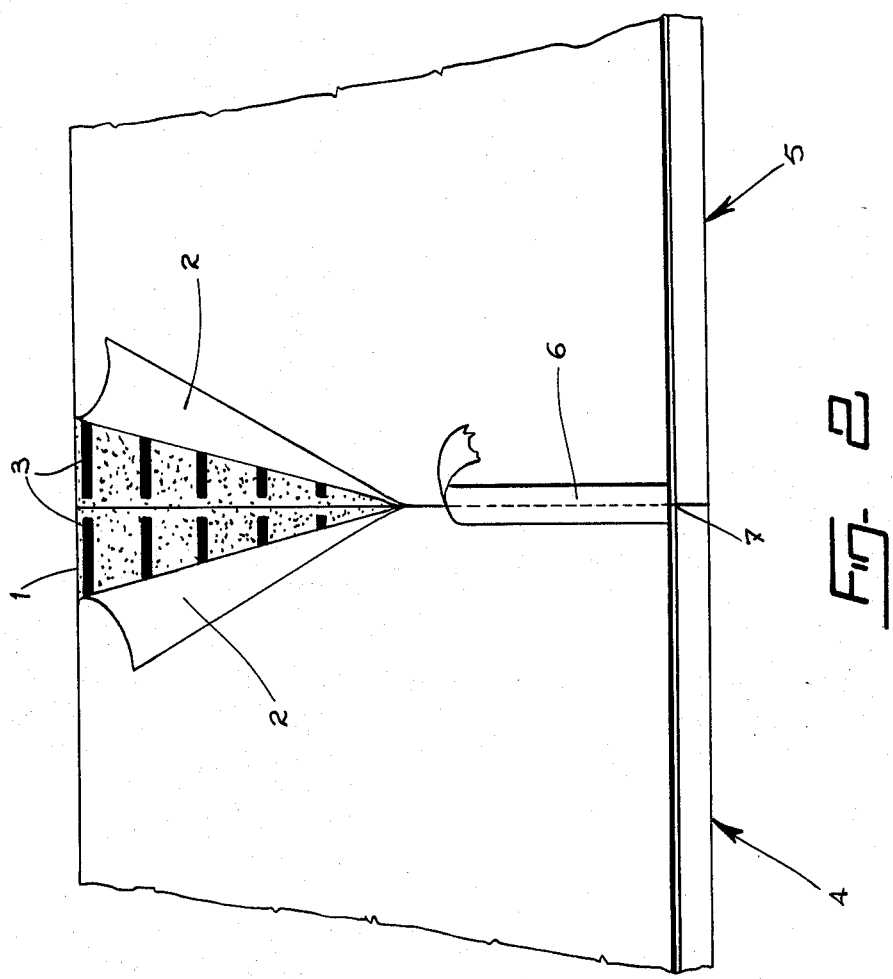
FIG. 2 shows a method of sealing the joint between two adjacent insulation panels both having a structure similar to that illustrated in FIG. 1.

FIG. 2 illustrates a method of sealing the joint 7 between two adjacent insulation panels 4 and 5 similar to that of FIG. 1.

When the two panels 4 and 5 have been mounted side by side as illustrated in FIG. 2 for covering the outside of an external wall of for example a residential house, a self-adhesive tape 6 is applied on the outer surface of the two adjacent membranes 2 in order to seal the joint 7 between the panels 4 and 5. As the TYVEK membranes 2 and the tape 6 form a system permeable to water vapor but impervious to air and moisture, a surface presenting uniform characteristics results from the latter operation.

A self-adhesive tape suitable for the above purpose is that manufactured and commercialized under No. Y 8086 by the company 3M CANADA INC. Such a tape is constituted of permanent acrylic adhesive with an oriented polypropylene backing.

Use of the laminated, thermal insulation panel in accordance with the present invention for externally covering the walls of for example a residential house results in the following advantages:

the TYVEK membrane can be in-plant laminated mechanically and automatically. Before lamination, the strips 3 of adhesive is applied on the ISOLOFOAM board surface;

the in-plant lamination of the insulation panel results in savings in labor costs;

the TYVEK membrane 2 constitutes a durable exterior layer for the ISOLOFOAM board which improves the puncture resistance and the durability of the expanded polystyrene. The membrane also protects the polystyrene board against direct exposure to the elements during construction. This enhances the quality of the final product;

the TYVEK membrane greatly reduces air infiltration through the wall structure from the outside and accordingly causes reduction in heating and cooling costs;

the TYVEK membrane additionally protects the inside of the walls and the polystyrene board against wind-driven moisture from the outside. This, in particular, maintains the high thermal resistance value of the polystyrene whereby an energy efficient insulation board is obtained;

when boards as shown in FIG. 1 are installed to cover the outside of for example a residential house, and using a self-adhesive tape 6 to seal the joints between these boards, an air and moisture tight overall envelope results as all the cracks and fissures are sealed; and the use of a laminated, thermal insulation panel as illustrated in FIG. 1 eliminates material losses due to wind damage and wide lapped joints (commonly 4 to 12 inches wide), eliminates any development of loose flaps being beaten and damaged by the action of strong winds, and eliminates all the guesswork on the on-site membrane application and fixation by the workers. This of course results in an enhanced quality of the final product.

During tests carried out on an insulation panel as that shown in FIG. 1 at pressure differences varying from 25 Pa to 250 Pa, no delamination of the membrane 2 was produced, and a reduction of 41% of air leakage compared with a polystyrene board with no laminated membrane was observed.

During other tests on a specimen of insulation panel similar to that of FIG. 1, comprising a polystyrene board 1 50 mm thick, it was observed that both the adhesive and TYVEK membrane had no significant effect on the permeability of the Type-1 ISOLOFOAM polystyrene board to water vapor.

By way of example, with a board 1 of 33 mm thick, and 47 mm thick, the thermal insulation provided by the laminated panel is respectively R 4.7 and R 7.0.

Last of all, it should be pointed out that the most important advantage of the laminated, thermal insulation panel, according to the present invention, is that it constitutes a barrier to air and moisture from the outside to the inside, while it allows passage of water vapor from the inside to the outside, to thereby prevent any condensation, moisture and air infiltration within or through the wall assembly.

Although the present invention has been described herein above by way of a preferred embodiment thereof, it should be pointed out that any modification to this preferred embodiment, within the scope of the appended claims, is not deemed to change or alter the nature and scope of the present invention.

What is claimed is:

1. A laminated, thermal insulation panel comprising:
   a board made of expanded polystyrene permeable to water vapor;
   a membrane laminated over one side of the polystyrene board, said membrane presenting imperviousness to air and moisture and being permeable to water vapor; and
   an adhesive applied between said membrane and board for laminating said membrane on said one side of the polystyrene board, said adhesive being applied in a pattern to ensure permeability to water vapor and being compatible with both the polystyrene of the board and the material constituting the membrane, so that the adhesive does not chemically attack the board polystyrene and the membrane material whereby the water vapor permeability of the board polystyrene and of the membrane material as well as the air/moisture imperviousness of the membrane material are not affected by the adhesive.

2. An insulation panel according to claim 1, wherein said membrane is composed of fine synthetic fibers.

3. An insulation panel according to claim 2, in which said membrane is made of non-woven, spunbonded olefin.

4. An insulation panel according to claim 1, wherein said board is made of expanded, molded polystyrene.

5. An insulation panel according to claim 1, wherein said adhesive is a pressure-sensitive adhesive.

6. An insulation panel according to claim 5, wherein said adhesive comprises a blend of synthetic rubber and of aliphatic/aromatic hydrocarbons in a solvent.

7. An insulation panel according to claim 5, in which said adhesive comprises natural rubber.

8. An insulation panel according to claim 5, wherein said adhesive comprises moisture cured urethane.

9. An insulation panel according to claim 1, wherein said pattern comprises a plurality of strips of said adhesive applied between the said membrane and polystyrene board.

10. An insulation panel according to claim 3, wherein said adhesive comprises as elastomeric base a blend of polybutene and styrene-isoprene-styrene block copolymer, and as tackifying resins, a blend of synthetic hydrocarbon resins and rosin esters.

11. An insulation panel according to claim 4, wherein the expanded polystyrene of said board has a bulk density of 15.5 kg/m$^3$ and a thermal resistance of 26.6 m °K./W.

12. A method of thermally insulating the exterior walls of a construction, such as a residential house, comprising the steps of:

in-plant manufacturing laminated, thermal insulation panels each obtained by laminating a membrane over one side of a board made of expanded polystyrene, said board and membrane being both permeable to water vapor and said membrane being further impervious to air and moisture;

covering the outside of said walls with a plurality of said insulation panels with the membrane thereof at the exterior; and sealing the joints between adjacent ones of said covering panels with an adhesive tape impervious to air and moisture, said tape comprising an adhesive surface applied on the membranes of said adjacent panels.

13. An insulating method according to claim 12, wherein said tape comprises permanent acrylic adhesive with an oriented polypropylene backing.

14. An insulating method according to claim 12, wherein said membrane is composed of non-woven, spunbonded olefin.

15. An insulating method according to claim 12, wherein said in-plant manufacturing step comprises applying between the membrane and the polystyrene board an adhesive, which adhesive is applied in a pattern to ensure permeability to water vapor and is compatible with both the polystyrene of the board and material of the membrane, so that the adhesive does not chemically attack the polystyrene of said board and the material of said membrane whereby the water vapor permeability of the board polystyrene and of the membrane material as well as the air/moisture imperviousness of the membrane material are not affected by the adhesive.

16. An insulating method according to claim 15, wherein said pattern comprises a plurality of strips of said adhesive.

* * * * *